United States Patent
Drescher et al.

(10) Patent No.: US 9,733,068 B2
(45) Date of Patent: Aug. 15, 2017

(54) OPTICAL POSITION MEASURING DEVICE

(71) Applicant: DR. JOHANNES HEIDENHAN GMBH, Trauneut (DE)

(72) Inventors: Jörg Drescher, Samerberg (DE); Wolfgang Holzapfel, Obing (DE); Ralph Joerger, Traunstein (DE); Thomas Kälberer, Schrobenhausen (DE); Markus Meissner, Übersee (DE); Bernhard Musch, Traunreut (DE); Erwin Spanner, Traunstein (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/733,435

(22) Filed: Jun. 8, 2015

(65) Prior Publication Data

US 2015/0354944 A1     Dec. 10, 2015

(30) Foreign Application Priority Data

Jun. 10, 2014   (DE) .................. 10 2014 211 004

(51) Int. Cl.
  *G01B 9/02* (2006.01)
  *G01B 11/14* (2006.01)
  (Continued)

(52) U.S. Cl.
  CPC .......... *G01B 11/14* (2013.01); *G01B 9/02015* (2013.01); *G01D 5/266* (2013.01); *G01D 5/345* (2013.01); *G01D 5/34707* (2013.01)

(58) Field of Classification Search
  CPC  G01B 11/14; G01B 9/02015; G01B 2290/30; G01B 2290/70; G01D 5/266; G01D 5/345; G01D 5/34707
  (Continued)

(56) References Cited

U.S. PATENT DOCUMENTS

| 5,333,048 A  * | 7/1994 | Michel ..................... G01D 5/38 250/237 G |
| 6,259,531 B1 * | 7/2001 | Takamiya .......... G01D 5/34707 250/237 G |

(Continued)

FOREIGN PATENT DOCUMENTS

| EP | 0 481 356 | 4/1992 |
| EP | 1901041 A2 | 3/2008 |

(Continued)

OTHER PUBLICATIONS

Azzam et al, Polarization analysis based on grating conical diffraction, 2/SPIE vol. 1746 Polarization Analysis and Measurement 1992.*

(Continued)

*Primary Examiner* — Tarifur Chowdhury
*Assistant Examiner* — Jonathon Cook
(74) *Attorney, Agent, or Firm* — Andrews Kurth Kenyon LLP (57) ABSTRACT

In an optical position measuring device for detecting the relative position of a first measuring standard and a second measuring standard, movable relative to each other along at least one measuring direction, at a splitting grating, a beam bundle emitted by a light source is split up into at least two partial beam bundles. When passing through scanning beam paths, the partial beam bundles undergo different polarization-optical effects. After the differently polarized partial beam bundles are recombined at a combination grating, a plurality of phase-displaced, displacement-dependent scanning signals is able to be generated from the resulting beam bundle. No polarization-optical components are arranged in the scanning beam paths of the partial beam bundles between the splitting and recombination. To generate the different polarization-optical effects on the partial beam bundles, a conically incident illumination beam bundle (Continued)

impinges upon the splitting grating, the incident illumination beam bundle extending in a plane perpendicular to the measuring direction at an angle other than 0°, the plane of incidence being defined by the grating normal to the splitting grating and the direction of incidence of the illumination beam bundle. The scanning beam paths of the partial beam bundles are arranged in mirror symmetry with respect to the plane of incidence between the splitting and recombination.

19 Claims, 5 Drawing Sheets

(51) Int. Cl.
*G01D 5/26* (2006.01)
*G01D 5/34* (2006.01)
*G01D 5/347* (2006.01)

(58) Field of Classification Search
USPC ........................................................ 356/494
See application file for complete search history.

(56) References Cited

U.S. PATENT DOCUMENTS

| 7,796,272 | B2 | 9/2010 | Holzapfel | |
|---|---|---|---|---|
| 7,907,286 | B2 | 3/2011 | Holzapfel | |
| 8,804,131 | B2 | 8/2014 | Holzapfel | |
| 2004/0051881 | A1* | 3/2004 | Holzapfel | G01D 5/34715 356/616 |
| 2004/0090636 | A1* | 5/2004 | Holzapfel | G01D 5/26 356/499 |
| 2005/0057757 | A1* | 3/2005 | Colonna De Lega | G01B 11/0675 356/497 |
| 2008/0062432 | A1 | 3/2008 | Sandig et al. | |
| 2011/0141451 | A1* | 6/2011 | Yamaguchi | G01D 5/38 355/77 |
| 2011/0235051 | A1* | 9/2011 | Huber | G01B 11/14 356/499 |
| 2011/0286004 | A1 | 11/2011 | Holzapfel et al. | |
| 2011/0299093 | A1* | 12/2011 | Ishizuka | G01D 5/266 356/498 |
| 2012/0154805 | A1 | 6/2012 | Holzapfel | |
| 2012/0293809 | A1* | 11/2012 | Garczarek | G01B 11/02 356/614 |

FOREIGN PATENT DOCUMENTS

| EP | 2388558 A2 | 11/2011 |
|---|---|---|
| EP | 2450672 A2 | 5/2012 |
| EP | 2 466 272 | 6/2012 |
| WO | 2008/138501 | 11/2008 |

OTHER PUBLICATIONS

Depine et al, Reciprocity relations for s-p polarization conversion in conical diffraction, Optics Communications 117 (1995) 223-227.*
Torres et al, Influence of the conical diffraction on the light polarization of waves diffracted and transmitted by holographic volume gratings, SPIE vol. 3572, 3rd Iberoamerican Optics Meeting and 6th Latin American Meeting on Optics, Lasers, and Their Applications, 98 (Jul. 6, 1999).*
Moharam et al, Formulation for stable and efficient implementation of the rigorous coupled-wave analysis of binary gratings, Journal of the Optical Society of America A vol. 12, Issue 5, pp. 1068-1076 (1995).*
European Search Report issued in European Patent Application 15 17 0025, dated Oct. 9, 2015.
Jones calculus, in Wikipedia, retrieved from https://en.wikipedia.org/w/index.php?title=Jones_calculus&oldid=599777955.

* cited by examiner

FIG.1

Prior Art

OPTICAL POSITION MEASURING DEVICE

CROSS-REFERENCE TO RELATED APPLICATIONS

The present application claims priority to Application No. 10 2014 211 004.1, filed in the Federal Republic of Germany on Jun. 10, 2014, which is expressly incorporated herein in its entirety by reference thereto.

FIELD OF THE INVENTION

The present invention relates to an optical position measuring device, which is, for example, suitable for the highly precise determination of the relative position of two objects that are movable relative to each other.

BACKGROUND INFORMATION

Apart from intensity-related evaluation methods, conventional high-precision optical position measuring devices also use polarization-optical methods for the generation of three or more phase-displaced, displacement-dependent scanning signals in order to ascertain a position. As far as the polarization-optical generation of scanning signals is concerned, reference is made to European Published Patent Application No. 0 481 356, for example.

Figure 1:
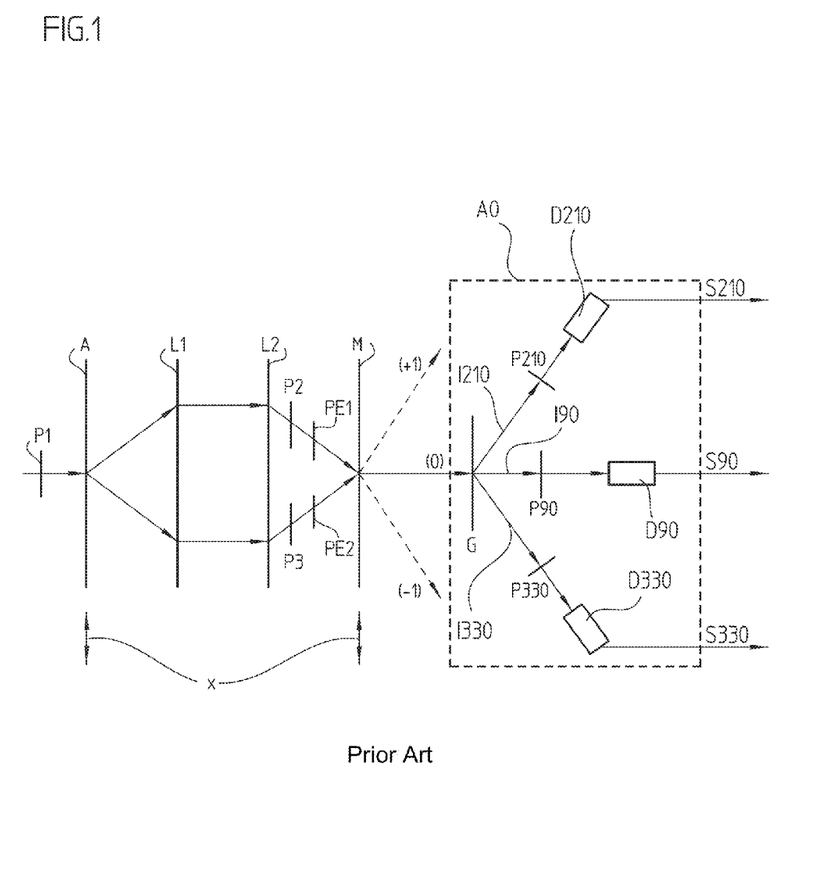
FIG. 1 schematically illustrates a conventional optical position measuring device.

The principle on which the signal generation according to European Published Patent Application No. 0 481 356 is based is schematically illustrated in FIG. 1, in a schematic illustration of the unfolded scanning beam path. Gratings A, M are jointly disposed along the indicated measuring direction x in a manner that allows them to move in relation to the other components L1, L2, AO. The beam bundle impinging from the left, which is polarized in a defined manner by polarizer P1, is split into two partial beam bundles via grating A. Polarization-optical elements, such as differently oriented lambda quarter-wave plates PE1, PE2, for example, are provided in the beam path of the partial beam bundles to be brought into interference, in which the positional information is encoded. The lambda quarter-wave plates PE1, PE2 polarize the two partial beam bundles passing through in a mutually orthogonal manner, i.e., the two partial beam bundles are then polarized in a left-hand-circular and right-hand-circular manner, for example. These two partial beam bundles are subsequently superposed to form a common signal beam bundle (0) and split up into three or more superposed partial beam bundles 190, 1210, 1330 in a downstream evaluator optics system AO. After passing through polarizers P90, P210, P330 of different orientations, scanning signals S90, S210, S330, each phase-displaced by 120° and able to be processed further in, e.g., a conventional manner, ultimately result at detector elements D90, D210, D330. In addition to lambda quarter-wave plates PE1, PE2, still further polarization-optical components in the form of polarizers P2, P3 are frequently placed in the beam paths of the split-up partial beam bundles in order to compensate for faulty polarizations, which were caused by gratings A, L1, L2 through which the partial beam paths passed earlier.

One disadvantage of such a polarization-optical generation of multiple phase-displaced and displacement-dependent scanning signals is the necessity of placing additional optical elements, such as lambda quarter-wave plates and polarizers, in the scanning beam path or in the scanning gap between the components that are moved relative to each other. Given limited space of the corresponding optical position measuring device or a short provided scanning distance, such additional components may pose a problem. If the position measuring device is to have a design similar to the principles described in PCT International Published Patent Application No. WO 2008/138501, components A, M and L1, L2 illustrated in FIG. 1 are provided in the form of two measuring standards, which are displaceable relative to each other. In this case, mechanically fixing interposed stationary polarization-optical components is frequently not possible.

Moreover, the additional polarization-optical components in the scanning beam path also pose greater demands on the evenness, parallelism, and homogeneity of the employed support structures. Required are drift-free and stable assembly surfaces for accommodating these support structures. In such a case, possible material faults are able to be compensated for only at very high additional expense with the aid of appropriate calibration methods. This is true, in particular, if long, translation-invariant scales are used in the corresponding optical position measuring devices.

Moreover, additional system properties such as natural frequencies and air flows in the scanning gap may also be negatively affected by additionally required polarization-optical components within the scanning beam paths.

An optical position measuring device featuring a polarization-optical generation of phase-displaced scanning signals without additional discrete polarization-optical components in the scanning beam paths is described, for example, in European Published Patent Application No. 2 466 272. According to this solution, the required polarization-optical components are designed to be integrated into other components of the scanning beam path, e.g., in the form of high-frequency gratings having periodically varying structures. The components used in such a position measuring device exhibit position-dependent polarization characteristics in the measuring direction. For example, the measuring standard is made up of multiple locally variable layers in this case and includes a high frequency grating having a graduation period $d_R < \lambda/2$, which has only a $0^{th}$ order of diffraction and produces the polarization-optical functionality. The grating orientation of the high-frequency grating varies by the polarization period $d_P > hw_{spot}$ along the measuring direction, which must be considerably greater than width $hw_{spot}$ of the illuminated region of the measuring standard delimiting the signal period SP of the generatable scanning signals in the downward direction. Since the $0^{th}$ order of diffraction of the high frequency grating is unable to induce a geometric beam deflection, another periodicity $d_T$ of a geometrically deflecting grating is required in addition, which is large enough to generate at least one first order of diffraction, which means that $d_T > \lambda/2$ must apply. Because polarization periodicity $d_P$ is not intended to lead to a geometric deflection either, it is selected considerably greater than periodicity $d_T$.

The following condition must therefore apply with regard to the dimensioning of the three periodicities $d_R$, $d_T$, and $d_P$ that arise in the different gratings:

$$d_R < \lambda/2 < d_T < hw_{spot} < d_P < 4\ SP.$$

As a matter of principle, gratings having small periodicities $d_R$ can be produced only by a technologically complex process. On the other hand, a small signal period SP is desirable for high resolution of the corresponding position measuring device. As a result, the position measuring device described in European Published Patent Application No. 2 466 272 is subject to certain restrictions with regard to the small available dimensioning range between $d_R$ and SP that may be utilized for the periodicities $d_T$ and $d_P$ of the corresponding gratings. Furthermore, certain restrictions exist with regard to width $hw_{spot}$ of the illuminated region of the measuring standard.

SUMMARY

Example embodiments of the present invention provide an optical position measuring device featuring a polarization-optical generation of phase-displaced scanning signals, which requires no additional polarization-optical components in the scanning beam path. The corresponding position measuring device should be subject to the fewest restrictions possible when certain signal periods of the generated scanning signals are required.

According to an example embodiment of the present invention, an optical position measuring device is used for detecting the relative position of a first measuring standard and a second measuring standard, which are situated in a manner that allows them to move relative each other along at least one measuring direction. At a splitting grating, one of the illumination beam bundles emitted by a light source is split up into at least two partial beam bundles. When passing through scanning beam paths, the partial beam bundles undergo different polarization-optical effects, and after the differently polarized partial beam bundles are recombined at a combination grating, multiple phase-displaced, phase-dependent scanning signals are able to be generated from the resulting signal beam bundle. No polarization-optical components are located in the scanning beam paths of the partial beam bundles between the split and recombination. To generate the different polarization-optical effects on the partial beam bundles:

a conically incident illumination beam bundle impinges upon the splitting grating, the incident illumination beam bundle extending in a plane of incidence perpendicular to the measuring direction at an angle other than 0°, the plane of incidence being defined by the grating normal to the splitting grating and the direction of incidence of the illumination beam bundle; and the scanning beam paths of the partial beam bundles are arranged in mirror symmetry with the plane of incidence between the splitting and recombination.

The illumination beam bundle emitted by the light source may have a linear polarization featuring symmetrical or antisymmetrical mirror symmetry with respect to the plane of incidence.

It may be provided that one or more grating(s) is/are situated in the scanning beam paths of the partial beam bundles between the splitting and recombination, which are provided such that:

the mirror symmetry with respect to the plane of incidence is maintained for the partial beam bundles, and in an interaction of the components, polarization crosstalk of partial beam bundles that are polarized in a perpendicular and parallel manner is possible.

At the recombination location, the partial beam bundles may have an opposite circular polarization.

As an alternative, the partial beam bundles may also have a mutually orthogonal, elliptical polarization at the recombination location.

It may furthermore be provided that the partial beam bundles at the recombination location are polarized such that the vector product of the associated Jones vectors does not exceed the value ⅔.

The first measuring standard may include a first reflection grating or transmission grating, which extends in the measuring direction and functions as a splitting grating for the illumination beam bundle.

The first measuring standard may include a second reflection grating or transmission grating, which extends in the measuring direction and functions as a combination grating for the partial beam bundles.

In this context, it may furthermore be the case that the second measuring standard includes a transparent plate in which a diffractive retro-reflector or a diffractive roof prism having a lens and a reflector is provided for each partial beam bundle.

Moreover, it may be provided that:

the lenses are provided in the form of at least one transmission grating on the first side of the transparent plate facing the first measuring standard, and the reflector is provided in the form of at least one reflective layer on the second side of the transparent plate facing away from the first measuring standard, whose reflecting side is oriented in the direction of the first side of the plate.

It is likewise possible that the components of the first measuring standard and of the second measuring standard are arranged and placed such that:

the illumination beam bundle impinging from the light source is split into two partial beam bundles at the first reflection grating of the first measuring standard and the partial beam bundles then propagate in the direction of the second measuring standard;

the partial beam bundles pass through a diffractive retro-reflector or a roof reflector in the transparent plate of the second measuring standard and then propagate back in the direction of the first measuring standard at a perpendicular offset with respect to the measuring direction; and the partial beam bundles come to superposition at the second reflection grating of the first measuring standard at a combination location, and a signal beam bundle featuring the pair of superposed partial beam bundles propagates back again in the direction of the second measuring standard.

A path-folding mirror, a grating, a lens, and multiple polarizers may be provided in a scanning unit, which is stationary in relation to the two measuring standards, and the scanning unit may be linked to a light source and multiple detector elements via one or more optical fiber(s).

In this context, it is furthermore possible that a light source, a path-folding mirror, a grating, a lens, multiple polarizers, and multiple detector elements are provided in a scanning unit that is stationary in relation to the two measuring standards.

It may be provided that each of the two measuring standards is situated so as to allow movement along at least one measuring direction.

An advantage of the optical position measuring devices described herein is that no separate polarization-optical components are required in the scanning beam path any longer. The required polarization-optical functionality results from the appropriate configuration of the scanning beam path and from the dimensions and arrangement of the traversed gratings in the scanning beam path.

The above-mentioned restrictions with regard to the dimensioning of the periodicities of the various gratings and the width of the illuminated region of the measuring standard thus are no longer relevant.

It is also possible to realize scanning operations featuring a polarization-optical generation of phase-displaced scanning signals in this manner, where the scanning gap is very small and would not allow the integration of additional polarization-optical components.

Realizable, in particular, are optical position measuring devices such as those described in PCT International Published Patent Application No. WO 2008/138501, which include two measuring standards that are movable in different directions, and for which no mechanical fixation for additional polarization-optical components would be possible in the scanning gap because of the two movement directions that are provided.

Further features and aspects of example embodiments of the present invention are described in more detail below with reference to the appended Figures.

BRIEF DESCRIPTION OF THE DRAWINGS

FIG. 3b is a second schematic view of the optical position measuring device illustrated in FIG. 3a.

DETAILED DESCRIPTION

Fundamental principles of the optical position measuring device according to example embodiments of the present invention are discussed below with reference FIGS. 2a to 4c.

Figure 2A:
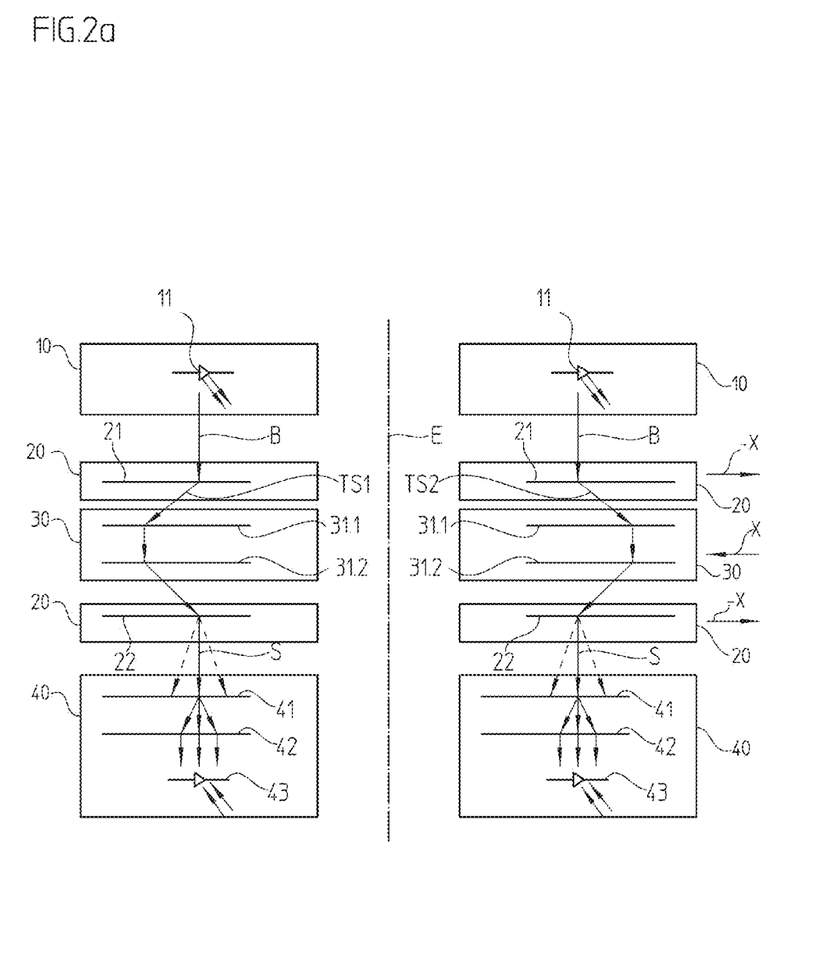
FIG. 2a is a first schematic view of the unfolded scanning beam path of the optical position measuring device according to an example embodiment of the present invention, in a plane that includes the measuring direction.
Figure 2B:
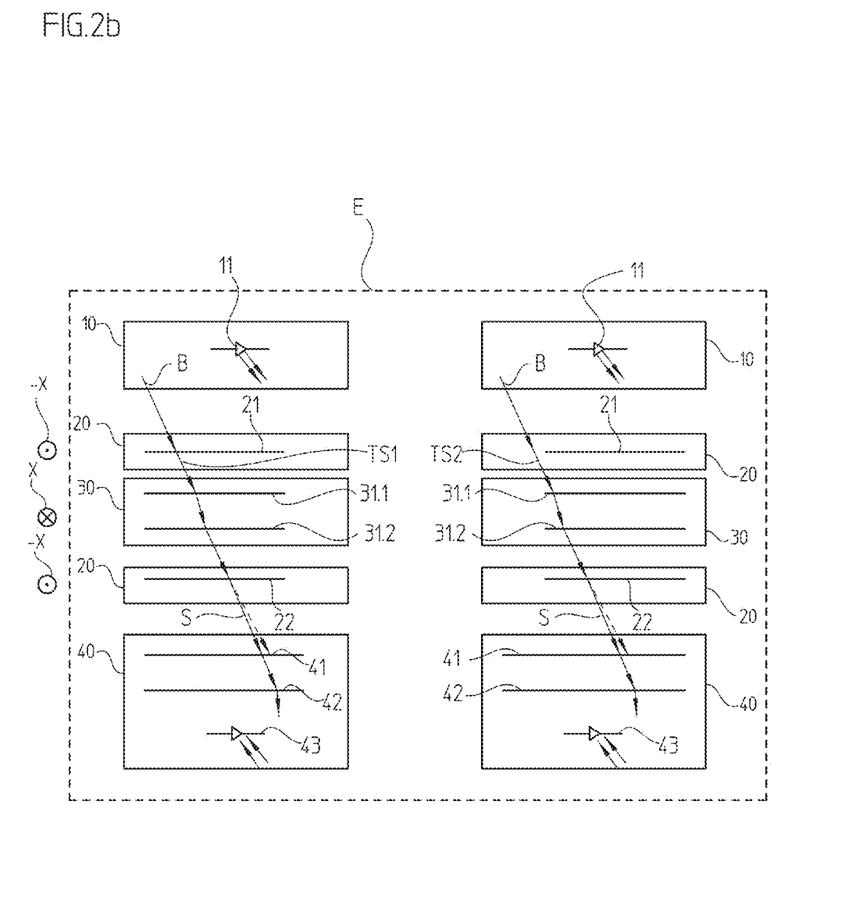
FIG. 2b is a second schematic view of the unfolded scanning beam path of the optical position measuring device illustrated in FIG. 2a, in a plane that is oriented perpendicular to the measuring direction.

FIGS. 2a and 2b schematically illustrate two different views of the scanning beam path of an optical position measuring device. FIG. 2a illustrates the unfolded scanning beam path in a plane that includes measuring direction x, and FIG. 2b illustrates the unfolded scanning beam path in a plane that is oriented perpendicular to measuring direction x.

As can be understood from the illustrated unfolded scanning beam paths, the optical position measuring device includes an illumination device 10 having a light source 11, a first measuring standard 20 having a splitting grating 21 and a combination grating 22, a second measuring standard 30 having a twice-traversed grating 31, and a detection unit 40 including a grating 41, polarizers 42, and a detector system 43.

The two measuring standards 20, 30 in the position measuring device are arranged in a manner that allows mutual movement or displacement along the indicated at least one measuring direction x. Each of the two measuring standards 20, 30 in the illustrated example is able to move along measuring direction x. As an alternative, it is basically sufficient that relative mobility of the two measuring is provided, e.g., that only one measuring standard is movable along at least one measuring direction, and the other is stationary, for example.

The two measuring standards 20, 30 may include both reflection and transmission gratings.

In the illustration of the unfolded beam path in FIGS. 2a and 2b, first measuring standard 20 is shown twice in each case, since it is acted upon twice in the course of the beam path, i.e., a first time by the illumination beam bundle B impinging from the direction of light source 11, which is split into two partial beam bundles TS1, TS2 at splitting grating 21 of first measuring standard 20, and a second time at a combination grating 22 by partial beam bundles TS1, TS2 undergoing the recombination. Analogous thereto, the two passed-through gratings 31.1, 31.2 in second measuring standard 30 are shown in FIGS. 2a and 2b as well.

The unfolded partial scanning beam paths of the two partial beam bundles TS1, TS2 split up at first measuring standard 20 can be seen in the individual partial depictions of FIGS. 2a and 2b. Between the splitting of the incident illumination beam bundle B at splitting grating 21 of first measuring standard 20 and the recombination of partial beam bundles TS1, TS2 at combination grating 22 of first measuring standard 20, partial beam bundles TS1, TS2 pass through second measuring standard 20, or rather the gratings 31.1, 31.2 provided there, on two occasions.

The pair of partial beam bundles TS1, TS2 recombined at combination grating 22 subsequently propagates as signal beam bundle S in the direction of detection unit 40, where multiple phase-displaced scanning signals are able to be generated therefrom in, e.g., a conventional polarization-optical manner with the aid of a grating 41, downstream polarizers 42, and detector system 43. As far as the design and method of functioning of detection unit 40 are concerned, reference is made to European Published Patent Application No. 0 481 356, mentioned above, which is expressly incorporated herein in its entirety by reference thereto.

In the position measuring device, multiple measures, which will be discussed in more detail below, ensure that the partial beam bundles TS1, TS2 to be superimposed are polarized in a mutually orthogonal manner. Propagating in the direction of detection unit 40 thus is a polarization-encoded signal beam bundle S, from which multiple phase-displaced scanning signals are able to be generated. Discrete polarization-optical components in the scanning beam path for generating the polarization-encoded signal beam bundle S are not required. Instead, the different polarization of the partial beam bundles TS1, TS2 that are going to be superposed is ensured by the measures described below.

One such measure consists of arranging the scanning beam paths of partial beam bundles TS1, TS2 in mirror symmetry with plane of incidence E between the split and the recombination, as illustrated in FIG. 2a. This symmetry refers both to the propagation direction of the partial beam bundles and their polarization directions. As illustrated in FIG. 2a, the plane of incidence has a perpendicular orientation with respect to the drawing plane. In general, plane of incidence E is to be defined as the plane that is bound by the direction of incidence of illumination beam bundle B propagating in the direction of first measuring standard 20, and the normal to splitting grating 21. The optical components integrated into measuring standards 20 and 30 are arranged to be substantially translation-invariant in measuring direction x. This ensures that the symmetry of illumination beam bundle B with respect to plane of incidence E is unable to be canceled by measuring standards 20 and 30.

The illumination beam bundles B emitted by the light source incidentally has a linear polarization exhibiting symmetrical or antisymmetrical mirror symmetry with respect to plane of incidence E. Illumination beam bundle B may be s-polarized or p-polarized here, i.e., the associated Jones vector $$\begin{pmatrix} E_x \\ E_y \end{pmatrix}$$

is $$\begin{pmatrix} 1 \\ 0 \end{pmatrix}$$

or $$\begin{pmatrix} 0 \\ 1 \end{pmatrix}.$$

In view of the Jones calculus for describing linear optical images while taking the polarization into account, reference is made to the "Jones Calculus" entry in the Internet Wikipedia encyclopedia (see, e.g., Mar. 15, 2014 revision).

Furthermore, splitting grating 21 on first measuring standard 20 is impinged upon by a conically incident illumination beam bundle B, e.g., at an angle that is not perpendicular. Incident illumination beam bundle B extends in a plane perpendicular to measuring direction x at an angle other than 0°. It therefore has a directional propagation component that is oriented perpendicularly to the grating normal of splitting grating 21 and perpendicularly to measuring direction x. No directional component in measuring direction x is included in illumination beam bundle B. For this, illumination unit 10 including light source 11 must be appropriately designed or disposed, possibly such that illumination beam bundle B does not lie in the z-direction, but in the yz plane, if x denotes the measuring direction and z is the direction of the normal to first measuring standard 20. In view of the conical illumination of splitting grating 21, reference is made to FIG. 2b, for example, which illustrates the scanning beam path in plane of incidence E or illumination beam bundle B that impinges upon splitting grating 21 in plane of incidence E in an oblique manner. Plane of incidence E is defined by the grating normal to splitting grating 21 and the direction of incidence of illumination beam bundle B. The conical incidence of illumination beam bundle B upon measuring standards 20, 30 causes what is generally referred to as polarization crosstalk, which manifests itself in secondary diagonal elements $m_{sp}$ and $m_{ps}$, different from zero, of the Jones matrix of the optical system having the two measuring standards 20, 30, and leads to a differentiability of partial beam bundles TS1, TS2.

The reciprocal action of each grating 21, 22, 31.1, 31.2 with the corresponding partial beam bundles TS1, TS2 is described via a Jones matrix $M_Z^{(n)}$, which is a function of the individual layer and of grating parameters and describes the over-coupling of the electric field into the possible polarization states s and p in correct phase relation.

Splitting grating 21 is denoted by A below, the two lens gratings 31.1, 31.2 are denoted by L1, L2, a reflector 32 possibly provided between the two lenses is denoted by R, and combination grating 22 is denoted by V.

The grating parameters of the different gratings 21, 22, 31.1, 31.2 are determined, for example, such that given an incoming s-polarized electrical field featuring the Jones vector $$\begin{pmatrix} 1 \\ 0 \end{pmatrix},$$

the orthogonally circular Jones vectors result for the two partial beam bundles TS1 and TS2:

$$M_V^{(-1)} M_{L2}^{(+1)} M_R^{(0)} M_{L1}^{(+1)} M_A^{(-1)} \begin{pmatrix} 1 \\ 0 \end{pmatrix} = \frac{1}{\sqrt{2}} \begin{pmatrix} 1 \\ -i \end{pmatrix} \quad \text{(Eq. 1)}$$

$$M_V^{(+1)} M_{L2}^{(-1)} M_R^{(0)} M_{L1}^{(-1)} M_A^{(+1)} \begin{pmatrix} 1 \\ 0 \end{pmatrix} = \frac{1}{\sqrt{2}} \begin{pmatrix} 1 \\ +i \end{pmatrix}$$

For reasons of symmetry, the two interfering partial beam bundles TS1, TS2 are circularly polarized. In a similar manner, the various gratings 21, 22, 31.1, 31.2 may also be arranged such that orthogonally circularly polarized partial beam bundles TS1 and TS2 with respect to each other are generated for an incoming p-polarized electrical field having the Jones vector $$\begin{pmatrix} 0 \\ 1 \end{pmatrix}.$$

As an alternative, gratings 21, 22, 31.1, 31.2 may also be optimized, so that partial beam bundles TS1, TS2 are polarized in a linearly orthogonal manner with respect to each other. Instead of Equation 1, the following Equation 2 then applies to an incoming s-polarized field:

$$\begin{pmatrix} E_x \\ E_y \end{pmatrix}_{TS1} = \quad \text{(Eq. 2)}$$

$$M_V^{(-1)} M_{L2}^{(+1)} M_R^{(0)} M_{L1}^{(+1)} M_A^{(-1)} \begin{pmatrix} 1 \\ 0 \end{pmatrix} = \frac{1}{\sqrt{2}} \begin{pmatrix} 1 \\ -1 \end{pmatrix}$$

$$\begin{pmatrix} E_x \\ E_y \end{pmatrix}_{TS2} = M_V^{(+1)} M_{L2}^{(-1)} M_R^{(0)} M_{L1}^{(-1)} M_A^{(+1)} \begin{pmatrix} 1 \\ 0 \end{pmatrix} = \frac{1}{\sqrt{2}} \begin{pmatrix} 1 \\ +1 \end{pmatrix}$$

In this case, exiting partial beam bundles TS1 and TS2 are linearly polarized at +45° or −45° and thus, once again, have a mirror-symmetrical and orthogonal polarization with respect to each other.

The above Equations 1 and 2 may be generalized to arrive at Equation 3:

$$\begin{pmatrix} E_x \\ E_y \end{pmatrix}_{TS1} = M_V^{(-1)} M_{L2}^{(+1)} M_R^{(0)} M_{L1}^{(+1)} M_A^{(-1)} \begin{pmatrix} E_x \\ E_y \end{pmatrix}_{in} = \frac{1}{\sqrt{2}} \begin{pmatrix} 1 \\ -e^{i\varphi} \end{pmatrix} \quad (\text{Eq. 3})$$

$$\begin{pmatrix} E_x \\ E_y \end{pmatrix}_{TS2} = M_V^{(+1)} M_{L2}^{(-1)} M_R^{(0)} M_{L1}^{(-1)} M_A^{(+1)} \begin{pmatrix} E_x \\ E_y \end{pmatrix}_{in} = \frac{1}{\sqrt{2}} \begin{pmatrix} 1 \\ +e^{i\varphi} \end{pmatrix}$$

The incoming electrical field having Jones vector $$\begin{pmatrix} E_x \\ E_y \end{pmatrix}_{in}$$

may either be s-polarized $$\begin{pmatrix} 1 \\ 0 \end{pmatrix}$$

or p-polarized $$\begin{pmatrix} 0 \\ 1 \end{pmatrix}.$$

Angle $\varphi$ is freely selectable. Regardless of angle $\varphi$, the two partial beam bundles TS1 and TS2 are always orthogonally polarized, e.g., the vector product of the two Jones vectors is zero (*=conjugate complex):

$$\begin{pmatrix} E_x \\ E_y \end{pmatrix}_{TS1} \cdot \begin{pmatrix} E_x \\ E_y \end{pmatrix}_{TS2}^* = 0 \quad (\text{Eq. 4})$$

Their polarization states are linearly polarized for $\varphi=0$ and $\varphi=\pi$ and circularly polarized for $\varphi=\pi/2$ and $\varphi=3\pi/2$. For $\varphi \neq n \cdot \pi$ (n=0, 1, 2, 3), the polarization is elliptical.

Because of these measures, a polarization-encoded signal beam bundle S is able to be generated by the optical position measuring device without having to place separate polarization-optical components between the measuring standards 20, 30 that are movable relative to each other. As desired, signal beam bundle S propagating in the direction of detection unit 40 thus includes two orthogonally polarized, superposed partial beam bundles TS1, TS2 and may be analyzed, e.g., in a conventional manner in order to generate the plurality of phase-displaced scanning signals. The two superposed partial beam bundles TS1 and TS2 are normally split up into multiple superposed partial beam bundles and converted with the aid of lambda half-wave or lambda quarter-wave plates into mutually superposed partial beam bundles that are orthogonally linearly polarized with respect to each other. They pass through polarizers and are converted into scanning signals by detectors. The phase relation of the scanning signals is adjustable by aligning the polarizers such that multiple mutually phase-displaced scanning signals are able to be generated.

The modulation degree of the scanning signals is a function of the orthogonality of the polarization of the two partial beam bundles TS1 and TS2. Tolerances in the production of gratings 21, 22, 31.1, 31.2 prevent the two partial beam bundles TS1, TS2 from having an ideal orthogonal polarization. For an adequate degree of modulation of at least 33%, the vector product of the associated Jones vectors may be maximally ⅔ in a deviation from Equation 4:

$$\begin{pmatrix} E_x \\ E_y \end{pmatrix}_{TS1} \cdot \begin{pmatrix} E_x \\ E_y \end{pmatrix}_{TS2}^* < \frac{2}{3} \quad (\text{Eq. 5})$$

Figure 3A:
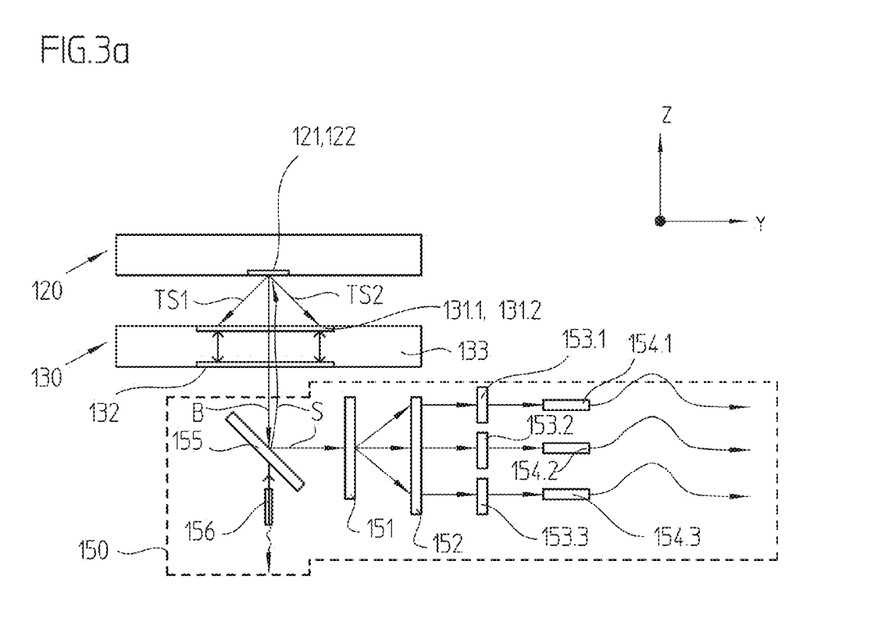
FIG. 3a is a first schematic view of an optical position measuring device according to an example embodiment of the present invention.
Figure 3B:
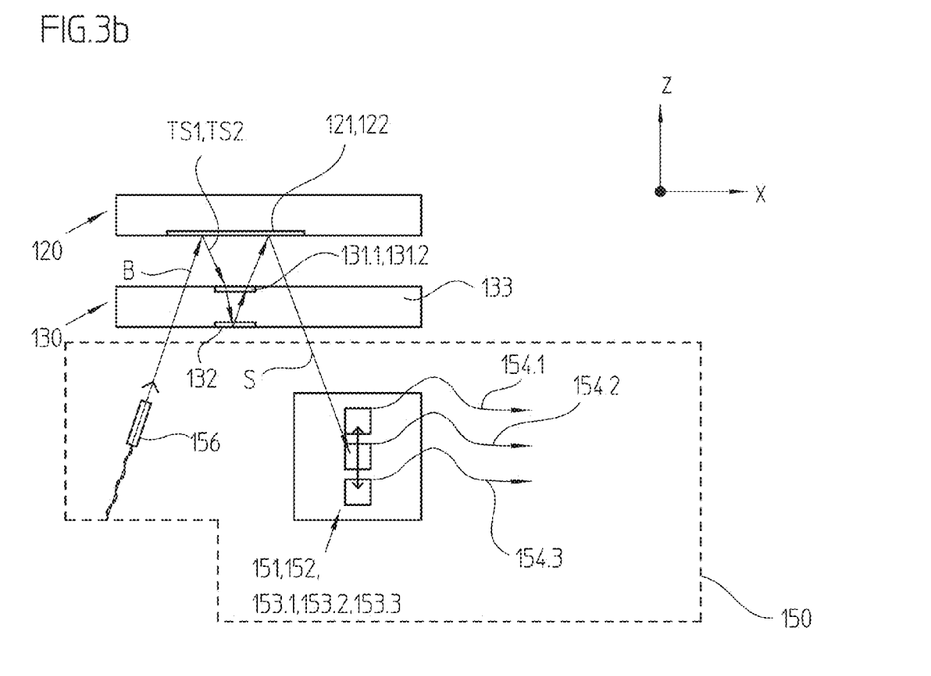
Figure 4A:
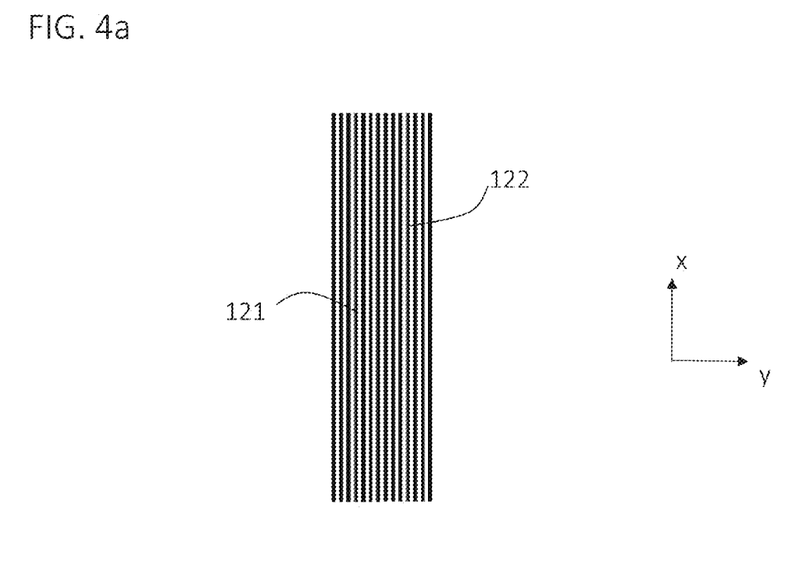
FIG. 4a is a plan view of the first measuring standard of the optical position measuring device illustrated in FIGS. 3a and 3b, together with the reflection gratings situated thereon.
Figure 4B:
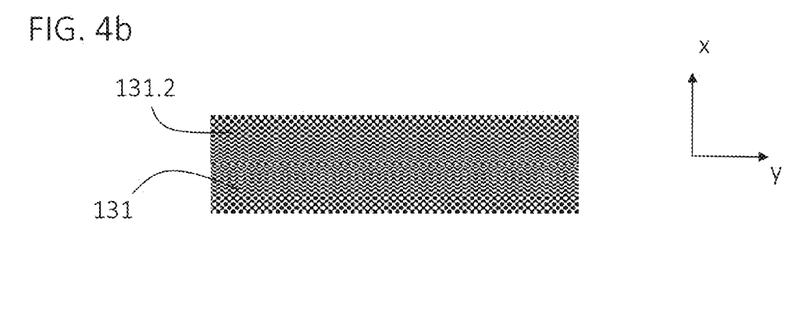
FIG. 4b is a plan view of the first side of the second measuring standard of the optical position measuring device illustrated in FIGS. 3a and 3b, together with the transmission grating situated thereon.
Figure 4C:
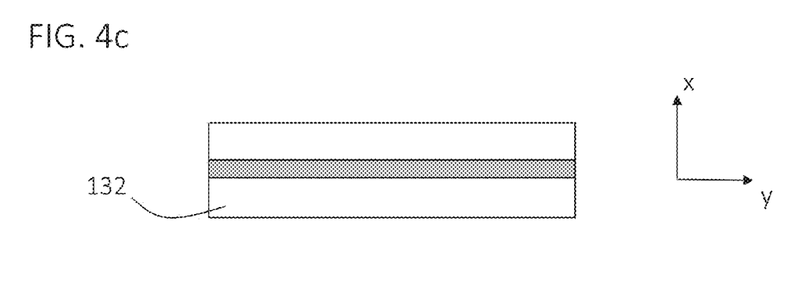
FIG. 4c is a plan view of the second side of the second measuring standard of the optical position measuring device illustrated in FIGS. 3a and 3b, together with the reflector situated thereon.

FIGS. 3a to 4c illustrate an example embodiment of the optical position measuring device. While FIGS. 3a and 3b schematically illustrate different cross-sectional views of the position measuring device, FIGS. 4a to 4c are plan views of different components of the position measuring device.

The position measuring device includes two measuring standards 120, 130, which, analogously to FIGS. 2a and 2b, are situated so as to allow movement along measuring direction y. A scanning unit 150, which includes different optical components, is fixed in place in relation to movable measuring standards 120, 130. Optical fibers 156, 154.1 to 154.3 link scanning unit 150 to a light source and to multiple opto-electronic detector elements.

Scanning unit 150 and measuring standards 120, 130, for example, are mechanically coupled to machine components, whose relative positions are ascertainable with the aid of the position measuring device. The displacement-dependent scanning signals generated by the position measuring device are processed further by a machine control for positioning the machine components.

Illumination beam bundle B emitted by the light source is transmitted to scanning unit 150 via optical fiber 156. It first passes through an optically inactive region of second measuring standard 130 and then impinges upon a splitting grating 121, which is arranged as a reflection grating, on the side of first measuring standard 120. As illustrated in FIG. 4a, splitting grating 121 includes a system of reflecting and non-reflecting scale graduations, which are periodic in measuring direction y and in turn extend parallel to the x-direction with their longitudinal axis.

At the reflectively designed splitting grating 121 of first measuring standard 120, illumination beam bundle B, which conically impinges thereon, is diffracted or split up into two first orders of diffraction or into two partial beam bundles TS1, TS2. The two partial beam bundles TS1, TS2 then pass through the scanning gap between first measuring standard 120 and second measuring standard 130 and subsequently impinge upon second measuring standard 130.

Second measuring standard 130 includes a transparent plate 133 on whose first side facing first measuring standard 120 two transmission gratings 131.1, 131.2 extending in the y-direction are provided. On the opposite, second side of plate 133, there is a reflector 132 in the form of a reflective layer, whose reflecting side faces the direction of the first side of transparent plate 133. In the exemplary embodiment illustrated, this arrangement of second measuring standard 130 is used to provide a diffractive roof reflector for the two partial beam bundles TS1, TS2 impinging thereon, the roof reflector including two lenses and a reflector in each case. The lenses are formed by transmission gratings 131.1, 131.2, and reflector 132 is formed by the reflective layer.

As illustrated in FIG. 3b, after passing through transmission grating 131.1 for the first time, the reflection at reflector 132, and the renewed passage through transmission grating 131.2, partial beam bundles TS1, TS2 are therefore reflected back in the direction of first measuring standard 120 at a perpendicular offset with respect to measuring direction y. On first measuring standard 120, partial beam bundles TS1, TS2 are superposed at a combination location on a combination grating 122, so that a signal beam bundle S then propagates back again in the direction of second measuring standard 130. There, signal beam bundle S passes through an optically inactive region of transparent plate 133 and, following a deflection via an outcoupling mirror 155, reaches a detection unit, which, for example, includes grating 151, a lens 152, and polarizers 153.1, 153.2, 153.3. In the exemplary embodiment, optical fibers 154.1, 154.2, 154.3 are arranged downstream from polarizers 153.1, 153.2, 153.3, which transmit the partial beam bundles, split via grating 151, to detector elements, which are located at a distance from scanning unit 150.

In the exemplary embodiment illustrated, the polarization-rotating functionality of the previously discussed quarter-wave plates required in conventional systems is provided by the symmetry of gratings 121, 122, 131.1, 131.2 of first and second measuring standards 120, 130. The previously required additional polarizers for compensating possible faulty polarizations are also not required in the optical position measuring device described herein. Without additional components in the scanning gap, possibly occurring polarization errors are fixedly correlated with the different gratings in the scanning beam path and thus reproducible. They may lead to interpolation errors, which, if required, are correctable by suitable compensation methods, such as an online compensation.

Via a simultaneous optimization of the layer and grating parameters of splitting grating 121, transmission gratings 131.1, 131.2, the reflector and combination grating 122, the polarization crosstalk component is able to be optimized such that a maximum modulation of the interfering partial beam bundles is achieved. The reciprocal action of each grating 121, 122, 131.1, 131.2 with the corresponding partial beam bundles is described via a Jones matrix $M_Z^{(n)}$, which is a function of the individual layer and grating parameters and describes the over-coupling of the electric field into the possible polarization states s and p in correct phase relation.

In addition to the exemplary embodiments described herein, there are of course additional possibilities within the framework hereof.

For example, it is possible that instead of two measuring standards that are separately movable along the measuring direction, only one of the two measuring standards is arranged so as to allow movement, whereas the other is stationary, for example, and assigned to a scanning unit.

It is also possible that one of the two measuring standards, or both, is/are additionally displaceable in a direction other than the measuring direction, in order to thereby construct a position measuring device as described in PCT International Published Patent Application No. WO 2008/138501 mentioned above.

Moreover, instead of the exemplary embodiment illustrated in FIGS. 3a and 3b, it is possible that that the light source and/or the detector elements is/are not situated at a distance from the scanning unit and coupled via optical fibers, but are integrated into the scanning unit.

In addition, it is possible that the splitting and combination gratings on the first measuring standard are arranged as a single grating and that it is not necessary to provide two separate grating tracks in this case.

Moreover, it may be provided that instead of the diffractive roof reflector provided in the above exemplary embodiment, a diffractive retro-reflector is provided in the second measuring standard, etc.

What is claimed is:

1. An optical position measuring device, comprising:
   a splitting grating adapted to split an illumination beam bundle emitted by a light source into at least two partial beam bundles;
   a combination grating adapted to recombine the partial beam bundles, so that a plurality of phase-displaced, displacement-dependent scanning signals is generatable from the resulting signal beam bundle, no polarization-optical components being located in scanning beam paths of the partial beam bundles between the splitting grating and the combination grating;
   wherein, in order to attain different polarization-optical effects on the partial beam bundles when passing through the scanning beam paths:
      a conically incident illumination beam bundle impinges upon the splitting grating, the incident illumination beam bundle extending in a plane of incidence perpendicular to the measuring direction at an angle other than 0°, and the plane of incidence defined by a grating normal to the splitting grating and a direction of incidence of the illumination beam bundle; and
      the scanning beam paths of the partial beam bundles are formed in mirror symmetry with respect to the plane of incidence; and
   wherein the optical position measuring device is adapted to detect a relative position of a first measuring standard and a second measuring standard, movable relative to each other along at least one measuring direction.

2. The optical position measuring device according to claim 1, wherein the illumination beam bundle emitted by the light source has a linear polarization having a symmetrical or antisymmetrical mirror symmetry with respect to the plane of incidence.

3. The optical position measuring device according to claim 2, wherein at least one grating is arranged in the scanning beam paths of the partial beam bundles between the splitting grating and the combination grating such that:
   the mirror symmetry with respect to the plane of incidence is maintained for the partial beam bundles; and
   a polarization crosstalk of partial beam bundles that are polarized in a perpendicular and parallel manner is possible.

4. The optical position measuring device according to claim 3, wherein the partial beam bundles have an opposite circular polarization at the recombination location.

5. The optical position measuring device according to claim 3, wherein the partial beam bundles have a mutually orthogonal elliptical polarization at the recombination location.

6. The optical position measuring device according to claim 3, wherein the partial beam bundles are polarized such that, at the recombination location, a vector product of associated Jones vectors does not exceed $\frac{2}{3}$.

7. The optical position measuring device according to claim 1, wherein the first measuring standard includes a first reflection grating or transmission grating, which extends in the measuring direction and functions as a splitting grating for the illumination beam bundle.

8. The optical position measuring device according to claim 7, wherein the first measuring standard includes a second reflection grating or transmission grating, which extends in the measuring direction and functions as a combination grating for the partial beam bundles.

9. The optical position measuring device according to claim 7, wherein the second measuring standard includes a transparent plate in which a diffractive roof prism having a lens and a reflector is provided for each partial beam bundle.

10. The optical position measuring device according to claim 9, wherein:
on a first side of the transparent plate facing the first measuring standard, the lenses include at least one transmission grating; and
on a second side of the transparent plate facing away from the first measuring standard, the reflector includes at least one reflecting layer, having a reflecting side oriented in a direction of the first side of the plate.

11. The optical position measuring device according to claim 9, wherein the first measuring standard and the second measuring standard are arranged such that:
the illumination beam bundle incident from the light source is split up into two partial beam bundles at the first reflection grating of the first measuring standard and the partial beam bundles then propagate in a direction of the second measuring standard;
the partial beam bundles pass through a diffractive retro-reflector or a roof reflector in the transparent plate of the second measuring standard and then propagate back again in a direction of the first measuring standard at a perpendicular offset with respect to the measuring direction; and
the partial beam bundles are superposed at a recombination location on the second reflection grating of the first measuring standard, and a signal beam bundle with the pair of superposed partial beam bundles propagates back again in the direction of the second measuring standard.

12. The optical position measuring device according to claim 11, further comprising a scanning unit, stationary in relation to the two measuring standards, including a path-folding mirror, a grating, a lens, and a plurality of polarizers, the scanning unit being coupled via at least one optical fiber to a light source and a plurality of detector elements.

13. The optical position measuring device according to claim 11, further comprising a scanning unit, stationary in relating to the two measuring standards, including a light source, a path-folding mirror, a grating, a lens, a plurality of polarizers, and a plurality of detector elements.

14. The optical position measuring device according to claim 8, wherein the second measuring standard includes a transparent plate in which a diffractive retro-reflector or a diffractive roof prism having a lens and a reflector is provided for each partial beam bundle.

15. The optical position measuring device according to claim 14, wherein:
on a first side of the transparent plate facing the first measuring standard, the lenses include at least one transmission grating; and
on a second side of the transparent plate facing away from the first measuring standard, the reflector includes at least one reflecting layer, having a reflecting side oriented in a direction of the first side of the plate.

16. The optical position measuring device according to claim 14, wherein the first measuring standard and the second measuring standard are arranged such that:
the illumination beam bundle incident from the light source is split up into two partial beam bundles at the first reflection grating of the first measuring standard and the partial beam bundles then propagate in a direction of the second measuring standard;
the partial beam bundles pass through a diffractive retro-reflector or a roof reflector in the transparent plate of the second measuring standard and then propagate back again in a direction of the first measuring standard at a perpendicular offset with respect to the measuring direction; and
the partial beam bundles are superposed at a recombination location on the second reflection grating of the first measuring standard, and a signal beam bundle with the pair of superposed partial beam bundles propagates back again in the direction of the second measuring standard.

17. The optical position measuring device according to claim 16, further comprising a scanning unit, stationary in relation to the two measuring standards, including a path-folding mirror, a grating, a lens, and a plurality of polarizers, the scanning unit being coupled via at least one optical fiber to a light source and a plurality of detector elements.

18. The optical position measuring device according to claim 16, further comprising a scanning unit, stationary in relating to the two measuring standards, including a light source, a path-folding mirror, a grating, a lens, a plurality of polarizers, and a plurality of detector elements.

19. The optical position measuring device according to claim 1, wherein each of the measuring standards is movable along at least one measuring direction.

* * * * *